United States Patent
Andersson et al.

(10) Patent No.: US 10,352,597 B2
(45) Date of Patent: Jul. 16, 2019

(54) EVAPORATION AND ABSORPTION UNIT

(71) Applicant: SWEP International AB, Landskrona (SE)

(72) Inventors: Sven Andersson, Hässleholm (SE); Tomas Dahlberg, Helsingborg (SE); Paris Chatzitakis, Burgwald-Bottendorf (DE); Belal Dawoud, Winterberg (DE); Jan Hertwig, Breidenbach (DE); Peter Kleem, Frankenberg (DE); Ulrich Vedder, Frankenberg (DE)

(73) Assignee: SWEP International AB, Landskrona (SE)

( * ) Notice: Subject to any disclaimer, the term of this patent is extended or adjusted under 35 U.S.C. 154(b) by 35 days.

(21) Appl. No.: 15/106,408

(22) PCT Filed: Dec. 19, 2014

(86) PCT No.: PCT/EP2014/078879
§ 371 (c)(1),
(2) Date: Jun. 20, 2016

(87) PCT Pub. No.: WO2015/092026
PCT Pub. Date: Jun. 25, 2015

(65) Prior Publication Data
US 2017/0003058 A1   Jan. 5, 2017

(30) Foreign Application Priority Data
Dec. 20, 2013   (EP) ..................................... 13198757

(51) Int. Cl.
*B01D 1/22* (2006.01)
*F28D 9/00* (2006.01)
(Continued)

(52) U.S. Cl.
CPC .............. *F25B 39/00* (2013.01); *B01D 1/221* (2013.01); *F25B 15/02* (2013.01); *F25B 39/022* (2013.01);
(Continued)

(58) Field of Classification Search
CPC ... B01D 53/1418; B01D 1/221; F25B 39/002; F25B 39/026; F25B 2339/022;
(Continued)

(56) References Cited

U.S. PATENT DOCUMENTS 4,586,565 A   5/1986   Hallström et al.
5,098,518 A   3/1992   Sakai et al.
(Continued)

FOREIGN PATENT DOCUMENTS

EP   0411123 A1   2/1991
GB   2089226 A    6/1982
(Continued)

OTHER PUBLICATIONS

Office Action for Chinese Patent Application No. 201480069777.1, dated Oct. 16, 2017.
(Continued)

*Primary Examiner* — Cassey D Bauer
(74) *Attorney, Agent, or Firm* — Merchant & Gould P.C.

(57) ABSTRACT

An evaporator for an absorption heat pump or a single coolant cooling process comprises a number of stacked plates provided with a pressed pattern to hold the plates on a distance from one another to form a heat exchanging strip, vapor leading spaces and outer walls, the heat exchanging strip being designed such that flow channels are formed by internal surfaces of the strip, said flow channels connecting a heat carrier inlet and a heat carrier outlet, wherein a coolant forms a falling film on external surfaces of the heat carrier channels by being provided above the heat carrier channels
(Continued)

by a coolant inlet, wherein coolant being vaporized from the external surfaces by heat from a heat carrier flowing from the inlet to the outlet rapidly enters the vapor leading spaces. The vapor leading spaces are provided between the heat exchanging strip and the outer walls.

25 Claims, 8 Drawing Sheets

(51) Int. Cl.
  *F25B 15/02* (2006.01)
  *F25B 39/00* (2006.01)
  *F25B 39/02* (2006.01)
  *F28D 21/00* (2006.01)

(52) U.S. Cl.
  CPC ............ *F25B 39/026* (2013.01); *F28D 9/005* (2013.01); *F25B 2339/02* (2013.01); *F25B 2339/021* (2013.01); *F28D 2021/0071* (2013.01)

(58) Field of Classification Search
  CPC ...... F28F 3/005; F28D 9/0037; F28D 9/0012; F28D 9/0031; F28D 9/005
  See application file for complete search history.

(56) References Cited

U.S. PATENT DOCUMENTS

| | | | |
|---|---|---|---|
| 5,538,593 A | 7/1996 | Sakai et al. | |
| 2005/0211421 A1* | 9/2005 | Ekelund | F28D 9/005 165/114 |
| 2012/0048526 A1* | 3/2012 | Helin | F28D 9/005 165/166 |
| 2013/0014538 A1 | 1/2013 | Garner | |

FOREIGN PATENT DOCUMENTS

| | | |
|---|---|---|
| JP | S57-122290 A | 7/1982 |
| JP | H10-300371 A | 11/1998 |
| JP | 2000-274965 A | 10/2000 |
| JP | 2003-240454 | 8/2003 |
| JP | 2004-093001 A | 3/2004 |
| JP | 2005-121319 A | 5/2005 |
| JP | 2006-064281 A | 3/2006 |
| JP | 2013-019664 A | 1/2013 |
| JP | 2013-142485 A | 7/2013 |
| WO | WO 90/09220 | 8/1990 |

OTHER PUBLICATIONS

International Search Report for No. PCT/EP2014/078879, dated Mar. 18, 2015.
English Translation of Office Action for Japanese Patent Application No. 2016-539894, dated Oct. 2, 2018.

* cited by examiner

EVAPORATION AND ABSORPTION UNIT

This application is a National Stage Application of PCT/EP2014/078879, filed 19 Dec. 2014, which claims benefit of application Ser. No. 13/198,757.0, filed 20 Dec. 2013 in Europe, and which applications are incorporated herein by reference. To the extent appropriate, a claim of priority is made to each of the above disclosed applications.

FIELD OF THE INVENTION

The present invention relates to an evaporator for an absorption heat pump or a single coolant cooling process, the evaporator comprising a number of stacked plates provided with a pressed pattern to hold the plates on a distance from one another to form a heat exchanging strip, vapor leading spaces and outer walls, the heat exchanging strip being designed such that flow channels are formed by internal surfaces of the strip, said flow channels connecting a heat carrier inlet and a heat carrier outlet, wherein a coolant forms a falling film on external surfaces of the heat carrier channels by being provided above the heat carrier channels by a coolant inlet, wherein coolant being vaporized from the external surfaces by heat from a heat carrier flowing from the inlet to the outlet rapidly enters the vapor leading spaces.

PRIOR ART

Absorption systems have en used for a long time in refrigerators in e.g. mini bars of hotel rooms and in refrigerators for mobile applications and remote areas without an electrical grid.

Absorption refrigerators use absorption and sorption of a two fluid coolant, and is powered by a high temperature heat source, e.g. a gas burner. The function of the absorption process is well known by persons skilled in the art, and will hence not be thoroughly discussed.

The last decade or so, there has been a surge in the interest for absorption heat pumps; in continental Europe, it is very common to heat buildings by gas, and an absorption heat pump is a possible way to reduce the consumption of gas by at least a factor 2.

In an absorption heat circuit there is at least five different heat exchangers; one generator, where coolant solution is heated by a high temperature heat source such that a volatile component is boiled off from a carrier, a condenser where the volatile component is condensed, an evaporator wherein the volatile component is evaporated by a low temperature heat source, an absorber wherein the low volatility component is absorbed into the carrier, and a solution heat exchanger wherein carrier from the generator exchanges heat with carrier from the absorber having a high content of volatile component on its way to the generator.

In case the heat pump is controlled by so called on/off operation, it is important that the thermal inertia of the evaporator and the absorber is as small as possible in order to get a rapid start-up of the absorption process.

Today, this is usually solved by providing a tube-and-shell heat exchanger and means for providing a "falling film" on the tubes comprised in the heat exchanger. Vapor formed from the falling film by heat exchange with e.g. a brine flowing in the tubes rapidly enters a space limited by the shell surrounding the tubes.

Tube-and-shell heat exchanger are however costly to manufacture, especially for small-scale absorption heat pumps.

One recent development of the tube-and-shell heat exchanger is a heat exchanger wherein the "tube" has been manufactured from sheet metal with a pressed pattern of ridges and grooves adapted to keep neighboring plates on a distance from one another under formation of flow channels, wherein every other channel is totally open to the surroundings, in a pressure tight compartment, which is manufactured from welded sheet metal or a cast metal frame. The manufacturing of these assemblies is also costly and material consuming. The present invention is aimed to provide a heat exchanger that has the benefits of the prior art heat exchangers, but may be manufactured in a more cost-efficient way.

SUMMARY OF THE INVENTION

The above and other problems are solved by a an evaporator wherein the vapor leading spaces are provided between the heat exchanging strip and the outer walls.

In order even out differences in gas flows between channels in the vapor leading spaces, they may be provided with openings.

In order to make it possible to extract non-evaporated coolant from the evaporator, a coolant outlet for letting out coolant that has fallen from the coolant inlet over the external surface of the heat exchanging strip (300; 500) without being vaporized may be provided.

A gas outlet situated above the coolant inlet may be used for letting out vaporized fluid.

If the evaporator is used in an absorption process, an absorption portion may be connected to the gas outlet.

In one embodiment of the invention, the absorption portion may be identical to the evaporator portion.

In order to facilitate the manufacturing process, the evaporator portion and the absorption portion may be manufactured from the same piece of sheet metal.

BRIEF DESCRIPTION OF THE DRAWINGS

Hereinafter, the invention will be described with reference to the appended drawings, wherein.

DESCRIPTION OF EMBODIMENTS

Figure 1:
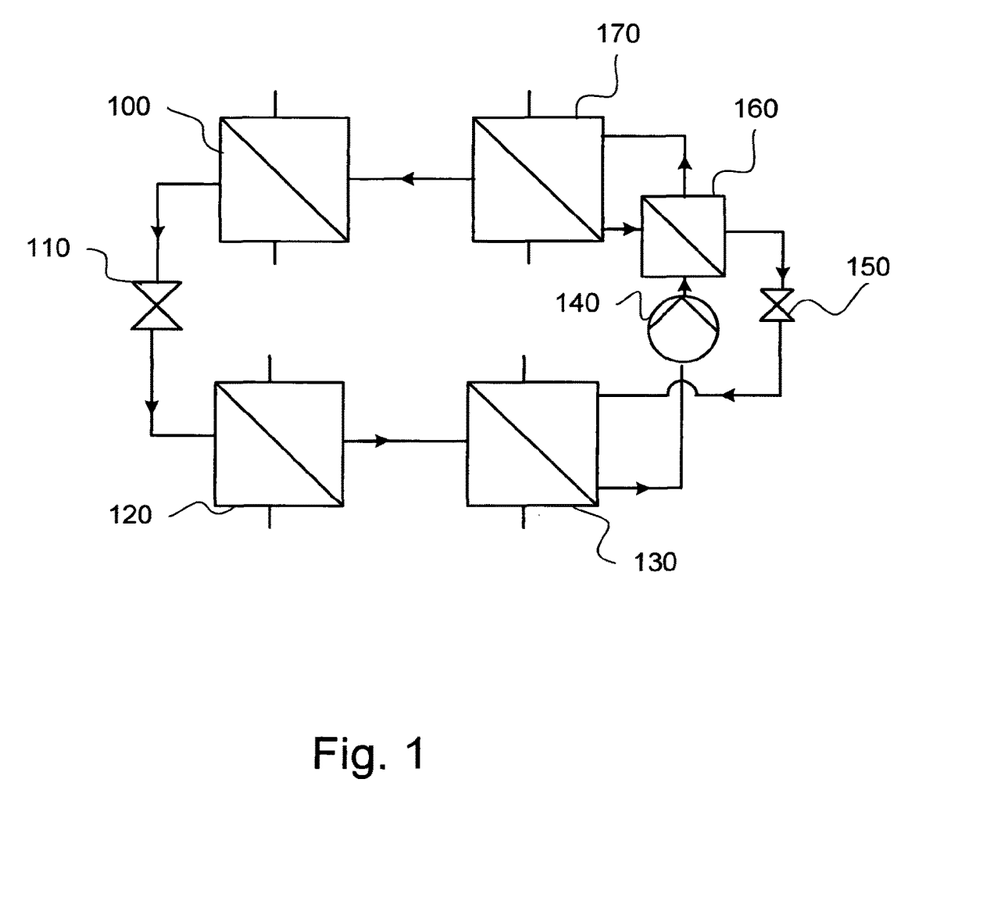
FIG. 1 is a schematic view showing an exemplary absorption system in which an evaporator according to the present invention may be used.

In FIG. 1, an exemplary absorption heat pump system 1 comprises a condenser 100, a first throttling valve 110, an evaporator 120, an absorber 130, a pump 140, a second throttling valve 150, a solution heat exchanger 160 and a generator 170. These components are connected by a piping network containing a mixture of a volatile component and a carrier able to absorb the volatile component.

Hereinafter, the absorption process will be briefly described with reference to the components of FIG. 1.

In the generator, a mixture of carrier and volatile component are heated by a high temperature heat source, e.g. an oil or gas flame. The volatile component will be separated from the carrier, and be conveyed, in gaseous form, to the condenser, where the gaseous steam will condense under heat exchange with e.g. a heat carrier of a heating system of a building. Both the generation of volatile component steam and the condensation of the same take place under a relatively high pressure.

The now liquid volatile component passes the throttling valve, such that the pressure, and consequently the boiling point, of the volatile component decreases. After the throttling valve, the volatile component enters the evaporator, in which the volatile component is evaporated by means of a low temperature heat source e.g. a brine circuit collecting heat from e.g. soil or ground water. Thereafter, the gaseous volatile component enters the absorber, in which liquid carrier from the generator is sprayed such that the gaseous volatile component may be absorbed by the carrier. The absorption generates heat that is heat exchanged to e.g. the heat carrier of the aforementioned heating system of a building.

The carrier with the absorbed volatile component is pumped by the pump 140 to the generator 170, via the solution heat exchanger, wherein the carrier with absorbed volatile component exchanges heat with carrier having passed the generator, i.e. carrier with a low content of volatile component, such that the carrier with absorbed volatile component will enter the generator with a relatively high temperature and the carrier having a low content of volatile component will enter the absorber with a relatively low temperature. The throttling valve 150 is necessary in order to keep the high pressure in the generator and the condenser.

Figure 2:
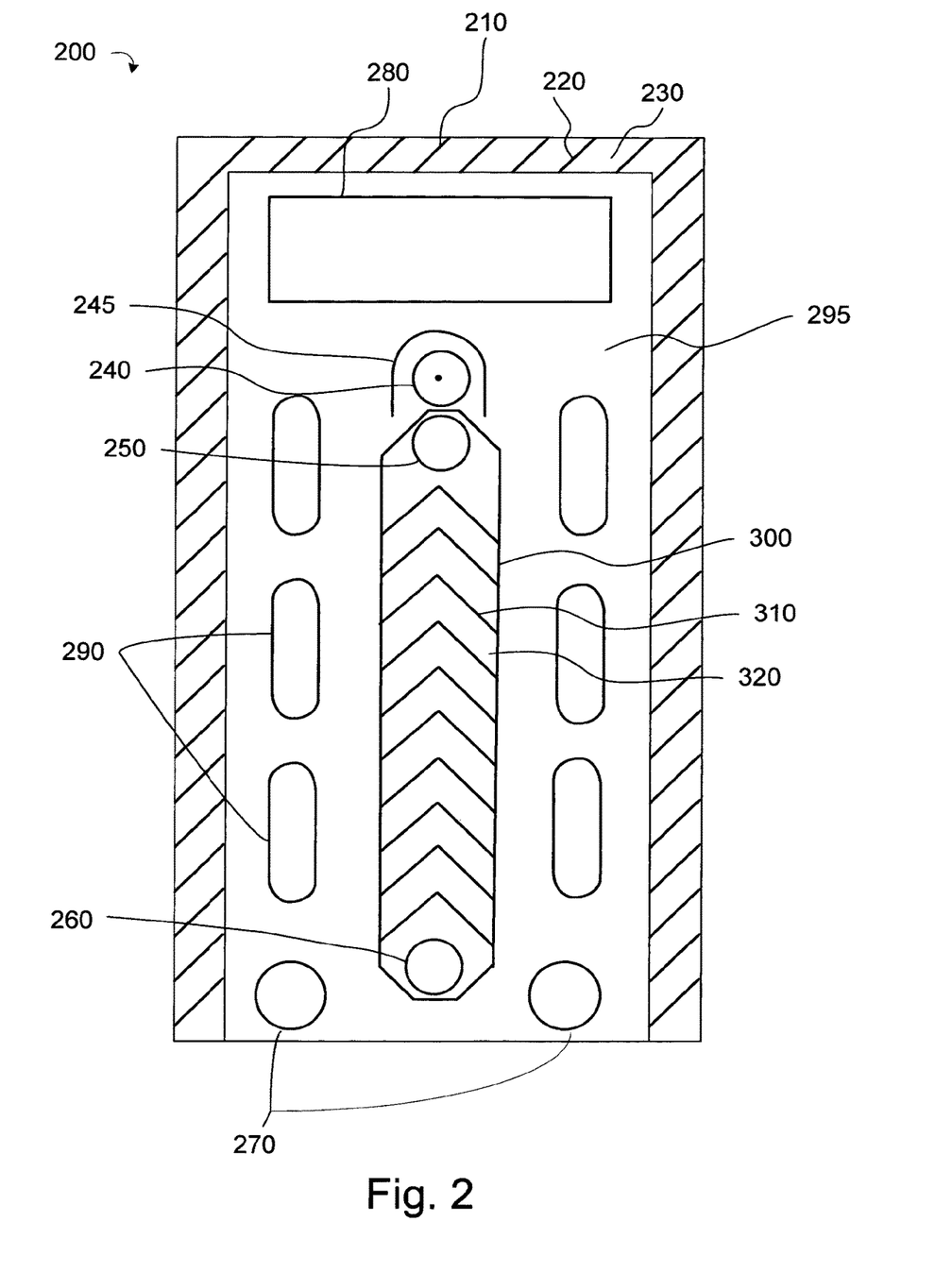
FIG. 2 is a plan view of a pressed plate used in an evaporator according to one embodiment according to the present invention.

In FIG. 2, a plate 200 comprised in an evaporator suitable for the process disclosed above is shown schematically. The plate 200 is preferably made from sheet metal and is provided with ridges and grooves arranged to keep neighboring plates on a distance from one another under formation of flow channels in a way to be described later. Preferably, the sheet metal plates are placed in a stack and brazed to form the evaporator.

The plate 200 comprises edge portions 210 with a skirt (not shown) extending in a perpendicular direction from the plate plane. These skirts are designed to contact skirts of neighboring plates to form a tight seal once the stack of plates described above has been brazed. In connection to the edge portions, there might be provided portions comprising ridges 220 and grooves 230, the ridges and grooves being designed to contact ridges and grooves of neighboring plates to form supports such that the stack of plates does not fall together, or shrink, during the brazing operation.

The plate 200 also comprises one inlet 240 for fluid to be evaporated, the inlet being partly encircled by a shroud 245, one brine outlet 250, one brine inlet 260 and at least one outlet 270 for non-evaporated fluid. The plate 200 also discloses a gas outlet 280 and optional gas circulation openings 290. An evaporator strip 300 is provided with ridges 310 and grooves 320 to form a flow channel between the brine inlet 260 and the brine outlet 250.

The plate 200 is designed to form flow channels by cooperating with neighboring plates basically being mirror images of the plate 200; the only exception from the mirroring is the direction of the ridges and grooves of the edge portions and the evaporator strip; whereas the ridges and grooves of the evaporator strip form arrowheads pointing upwards in FIG. 2, the ridges and grooves of the evaporator strip of its neighboring plates will form arrowheads pointing downwards. The ridges and grooves of the edge portions point upwards to the right, whereas the ridges and grooves of the neighboring plates will point downwards to the right. Hence, the ridges of one plate will form contact points with the grooves of an upper neighboring plate, and the grooves of the one plate will form contact points with the ridges of a lower neighboring plate.

It should be noted that instead of providing edge portions with a skirt, it is possible to provide the edge portion with an elevated area that is supposed to contact a corresponding elevated area of a neighboring plate if one of the plates is turned upside down. In such a plate design, it is not possible to have the ridges 310 and grooves 320 provided in a herringbone pattern, such as shown in FIG. 2. Rather, the ridges 310 and the grooves 320 shall extend in an inclined fashion over then entire evaporator strip 300; otherwise, there will be no crossing of ridges and grooves of neighboring strips.

The plate portions surrounding the strip 300 and all port openings are provided on different heights in order for allowing a controlled flow of e.g. brine, gas, liquid volatile component and carrier. With reference to the plate 200, the plate areas around the brine inlet and brine outlet are provided on a low level, whereas the shroud, the plate areas around the inlet for fluid to be vaporized, the strip 300, and the at least one outlet for unvaporized fluid are provided on a high level. Since the plates neighbouring the plate 200 are mirror images of the plate 200, this means that the plate areas around the brine inlet and brine outlet are provided at a high level, whereas the plate areas around the inlet for fluid to be vaporized, the strip 300, and the at least one outlet for unvaporized fluid are provided on a low level on the neighboring plates.

Then, by placing the plate 200 in a stack with neighboring plates, there will be formed different channels between the plates. Hereinafter, the channel formation between the plate 200 and a neighboring plate placed above the plate 200 will be disclosed. As mentioned, the neighboring plates are mirror images of one another, meaning that the shroud, the plate areas around the inlet for fluid to be vaporized, the areas around the strip 300, and the at least areas around the at least one outlet for unvaporized fluid of the two neighboring plates will contact one another. The ridges and grooves of the neighboring plates will also contact one another, such that the plates will be held on a distance from one another.

The contact surfaces between the two plates will form a tight seal in a subsequent brazing process, wherein the plates are joined to one another by brazing with a brazing material having a lower melting point than the metal the plates are manufactured from (usually, the brazing material is copper, but it is also possible to use other materials, e.g. stainless steel having additives in form of melting point depressants, such as silicon and/or phosphorous. The plates are preferably made from stainless steel).

Hence, different spaces, or flow channels, are formed between the plates; on one side of the plate 200, there will be a flow channel between the brine inlet and the brine outlet, and on the other side of the plate 200, there will be a flow channel 295, or vapor leading space, from the inlet for fluid to be vaporized to the at least one non-evaporated fluid. The same flow channel 295 will communicate with the optional gas circulation openings 290 and the gas outlet 280. The gas circulation openings 290 have the effect of evening out differences regarding gas pressure in the vapor leading spaces. Also, by removing material in the plate areas dividing neighboring vapor leading spaces from one another, the thermal inertia of the evaporator will be smaller. In other words, the time from start of the process until a certain mass flow of vapor from the evaporator will be shorter.

There will be no fluid contact between the brine flow channel and this flow channel. As mentioned earlier, there is also a tight seal around the circumference of the plates by the interaction between overlapping skirts. End plates (not shown) are arranged on either sides of the stack of plates and being provided with suitable openings for letting fluids in and out from the evaporator. Obviously, there are no gas circulation openings 290 provided in the end plates.

In use, the evaporator comprising plates 200 and neighboring plates stacked to a stack and brazed to form an evaporator is placed with the gas outlet in an upper position and consequently the at least one outlet for unvaporized fluid in a lower position. The brine inlets and outlets are connected to an external circuitry for providing a flow of brine there between.

The inlet for fluid to be vaporized is connected to a source of fluid (in the case of the heat pump system described above with reference to FIG. 1, the source of fluid is the fluid coming from the expansion valve), and the gas outlet is connected to the absorber. The efficiency of the evaporator will increase if it is secured that all surfaces of the strip 300 are wetted by the coolant. One way of ensuring this is by providing a distribution pipe, e.g. of the type disclosed in European patent application 08 499 27.2 in the inlet 240. The openings in the distribution pipe will distribute the flow evenly to all plate interspaces.

One of the at least one outlets for non-vaporized fluids may also be connected to the inlet for fluid to be vaporized should it turn out that the non-vaporized fluid (in this case, a mixture of carrier and volatile component), should it turn out that a too low percentage of the volatile component has vaporized. The other of the at least one outlet for non-vaporized fluid is connected to the generator of the aforementioned absorption system.

Figure 3:
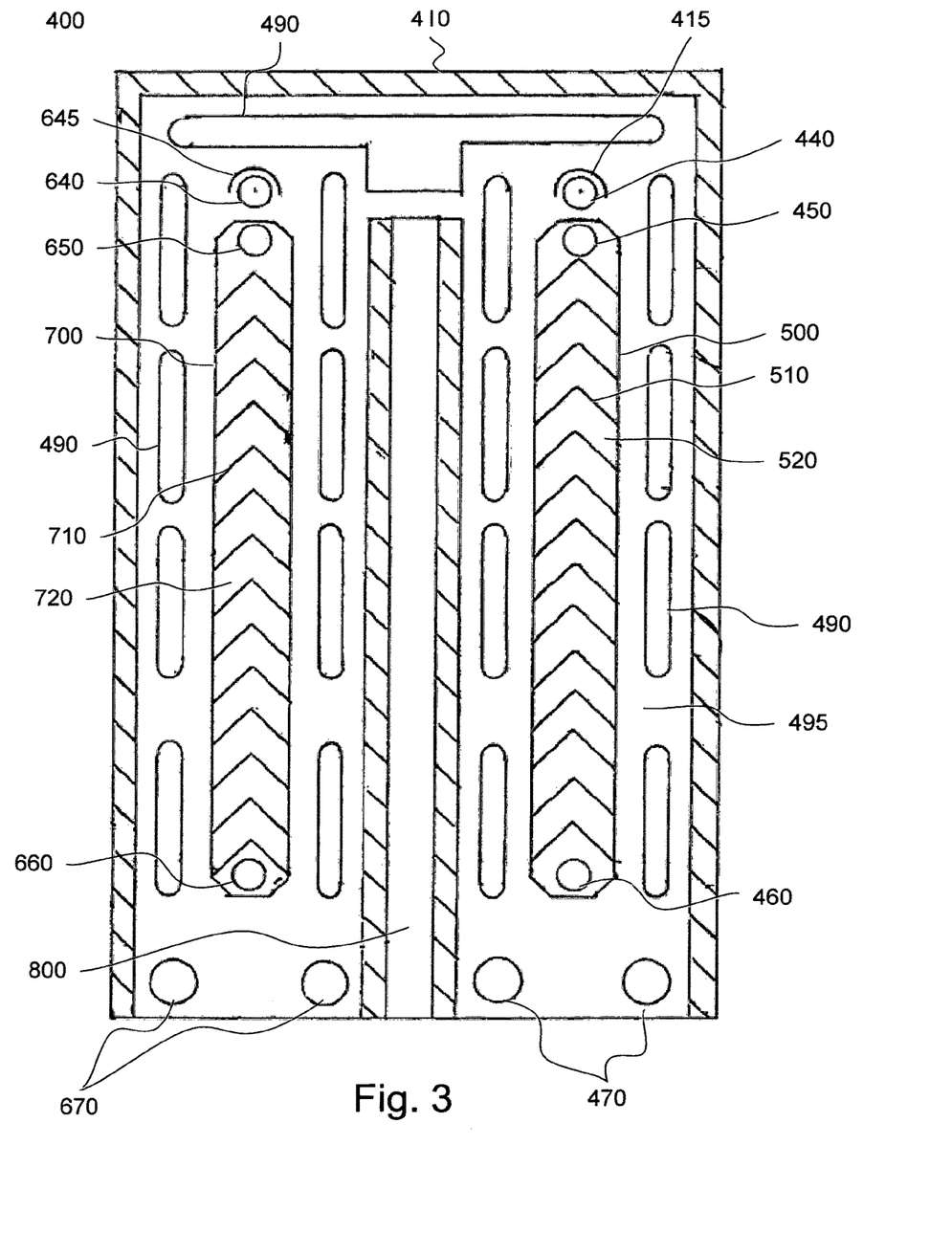
FIG. 3 is a plan view of a pressed plate used in an evaporator according to another embodiment according to the present invention.

In another embodiment of the invention, shown in FIG. 3, the evaporator and the absorber have been combined into a single unit.

Again with reference to FIG. 3, a plate 400 of a combined evaporator and absorber according to the present invention is shown. The plate 400 comprises an outer rim 420, wherein the outer rim is provided with skirts (not shown), said skirts being arranged to overlap one another when the plate 400 and neighboring plates are stacked in a stack to form the combined evaporator and absorber, hence providing a seal to the surroundings.

As can be seen in FIG. 3, the plate 400 comprises components having equal looks on right and left sides of a central axis running in an axial direction. In the following, the combined evaporator and absorber will be regarded as having the evaporator on the right side of FIG. 3 and the absorber on the left side thereof. An inlet 440 for fluid to be vaporized partly covered by a shroud 445 corresponds to an inlet 640 for carrier, a brine outlet 450 corresponds to an outlet 650 for heat carrier of e.g. a housing heating system, an evaporator strip 500 corresponds to an absorption strip 700, both strips 500, 700 being provided with a pressed pattern of ridges 510, 710 and grooves 520, 720 being arranged for keeping the plate 400 on a distance from its neighboring plates when stacked in the stack for forming the combined evaporator/absorber.

At least one outlet for non-vaporized fluid 470 corresponds to at least one outlet 670 for carrier solution having absorbed volatile component.

Between the evaporator portion and the absorber portion, there is a partitioning wall 800, there is a dividing wall 800. This wall may be designed in many different ways. For example, it is possible to continue with the skirt 410 such that a wall is formed. It is also possible to provide high and low areas on the plate 400 and its neighboring plates such that a seal is provided. In this context, it might be worth mentioning that it is possible to design the skirt and the high and low areas such that an hermetically sealed space is provided within the dividing wall 800. This is very beneficial from a thermal point of view; most heat exchangers are brazed in a furnace under vacuum, and if a sealed space is formed, the vacuum will be retained also after the brazing process.

As well known, vacuum is the best thermal insulator known to man, and by providing spaces under vacuum in the dividing wall, heat transfer between the absorber portion and the evaporator portion may be significantly reduced.

Figure 4:
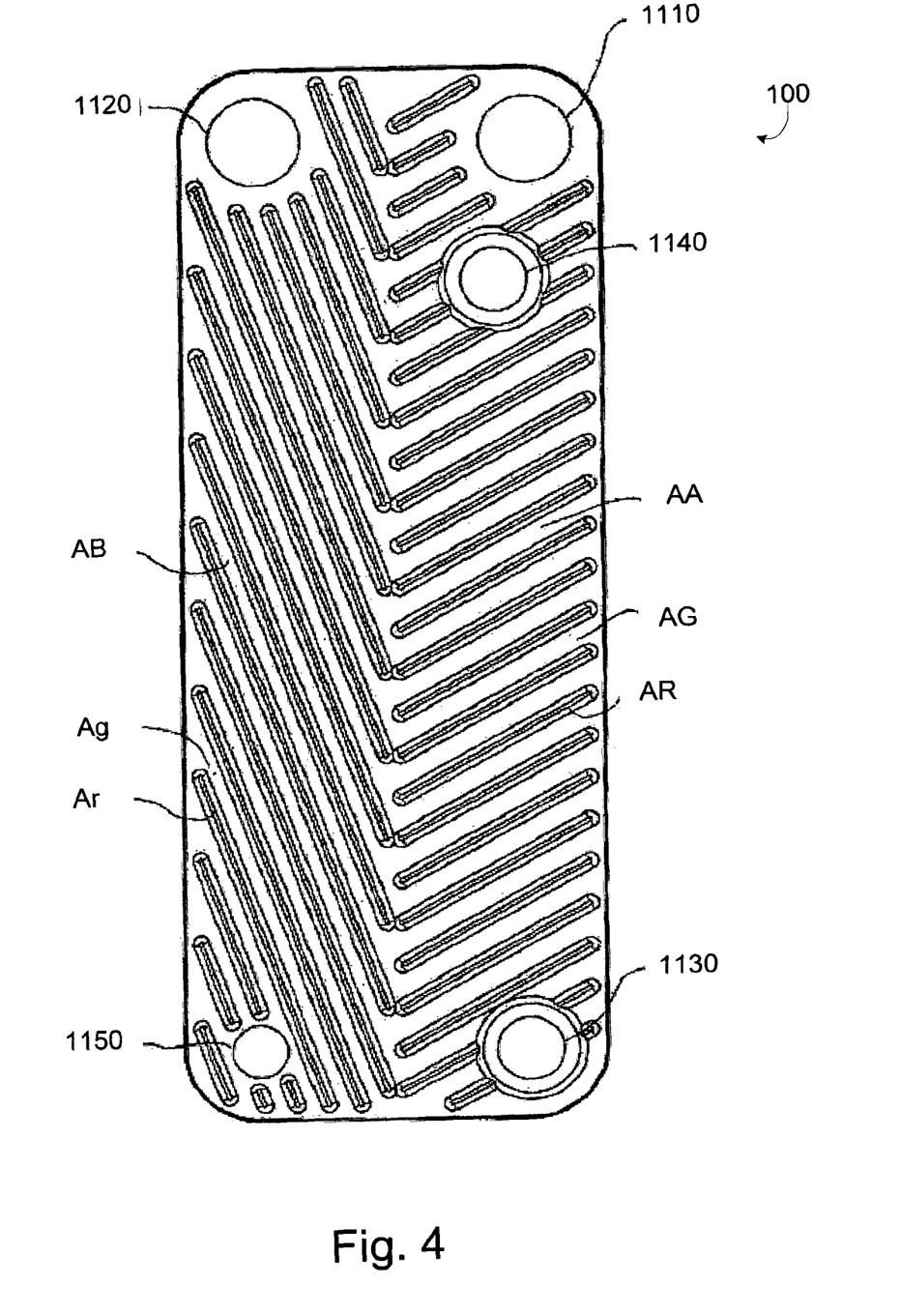
FIG. 4 is a plan view of a pressed plate used in an evaporator according to still another embodiment of the invention.

With reference to FIG. 4, a plate 1100 of one embodiment of an evaporator according to the present invention is shown. The plate 1100 comprises an inlet 1110 for a mixture of carrier and volatile component, an outlet 1120 gaseous volatile component, a brine inlet 1130, a brine outlet 1140 and a carrier outlet 1150. Moreover, the plate 1100 comprises two distinct areas AA and AB, wherein the area AA comprises ridges AR and grooves AG, and the area AB comprises ridges Ar and grooves Ag. As can be seen in FIG. 4, the ridges and grooves of the areas AA and AB run in slightly different directions, and there are twice as many ridges AR than ridges Ar. More of this later.

In use, a plate 1100 will neighbor two other plates (not shown) having corresponding inlet and outlet openings for carrier, volatile component, solutions thereof and brine and also corresponding areas AA and AB. The plates neighboring the plate 1100 are very similar to the plate 1100, but the heights of the ridges and grooves and the areas surrounding the inlet and outlet openings are mirrored from one another. Also, the ridges and grooves of the areas AA and AB of the neighboring plates are arranged such that the ridges and grooves of neighboring plates will form contact points between crossings of the ridges and grooves of neighboring plates. Also, the edge areas of the plates are provided with skirts designed such that skirts of neighboring plates will overlap to seal a space between two plates.

In order to form an evaporator according to the invention, a number of plates 1100 and its neighboring plates as disclosed above are stacked onto one another to form a stack of plates, just like in the embodiments disclosed with reference to FIGS. 2-3. Usually, a layer of brazing material is placed in the space between the plates, after which the stack of plates is placed in a brazing oven to be brazed into an evaporator. During the brazing, the contact points formed by the ridges and grooves and the skirts of the plates will be brazed together, such that the plates will form interplate spaces between one another.

As briefly mentioned above, the areas surrounding the inlet and outlet openings are provided at different heights, such that selective communication between the openings and the interplate spaces may be achieved.

In the case of the plate 1100, there will be a communication between the brine inlet 1130 and the brine outlet 1140, and also a communication between the carrier/volatile component inlet and outlets 1110, 1120, 1150. The communication between the brine inlets and outlets will take place over the area AA, between a first pair of plates, and the communication between the coolant inlet and outlets will take place over both areas AA and AB.

In use, there will be a brine or other energy provider flowing from the brine inlet 1130 to the brine outlet 1140 and having a higher temperature than the boiling temperature of the volatile component. It should be noted that the evaporator preferably is mounted such that the brine travels in an upward direction, i.e. against the force of gravity.

The mixture of carrier and volatile component to be evaporated is let in through the coolant inlet 1110, and is allowed to fall down the walls of the space limited by the area AA. Due to the ridges AR and grooves AG running in different direction, the liquid mixture will spread evenly and form a film covering most part of the area AA. As mentioned, the brine temperature is such that it exceeds the boiling temperature of the volatile component. Hence, volatile component will boil off from the film covering the area AA. Volatile component having been vaporized from the film covering the area AA may escape this area and enter the area AB, where no heat exchange with any brine takes place. Since the vaporized coolant has no other way to go, it will be forced to leave the area AB through the outlet 1120.

When it comes to the area AB, it may be possible to increase the efficient volume of this area by providing it with openings such that the evaporated coolant may travel up to the port 1120 on both sides of the plates; in this case, it is of course crucial that the brine flow portion of the area AA is sealed off from communication with the area AB.

Compared to a prior art plate evaporator, there will be very little overheating of the evaporated coolant.

Figure 5:
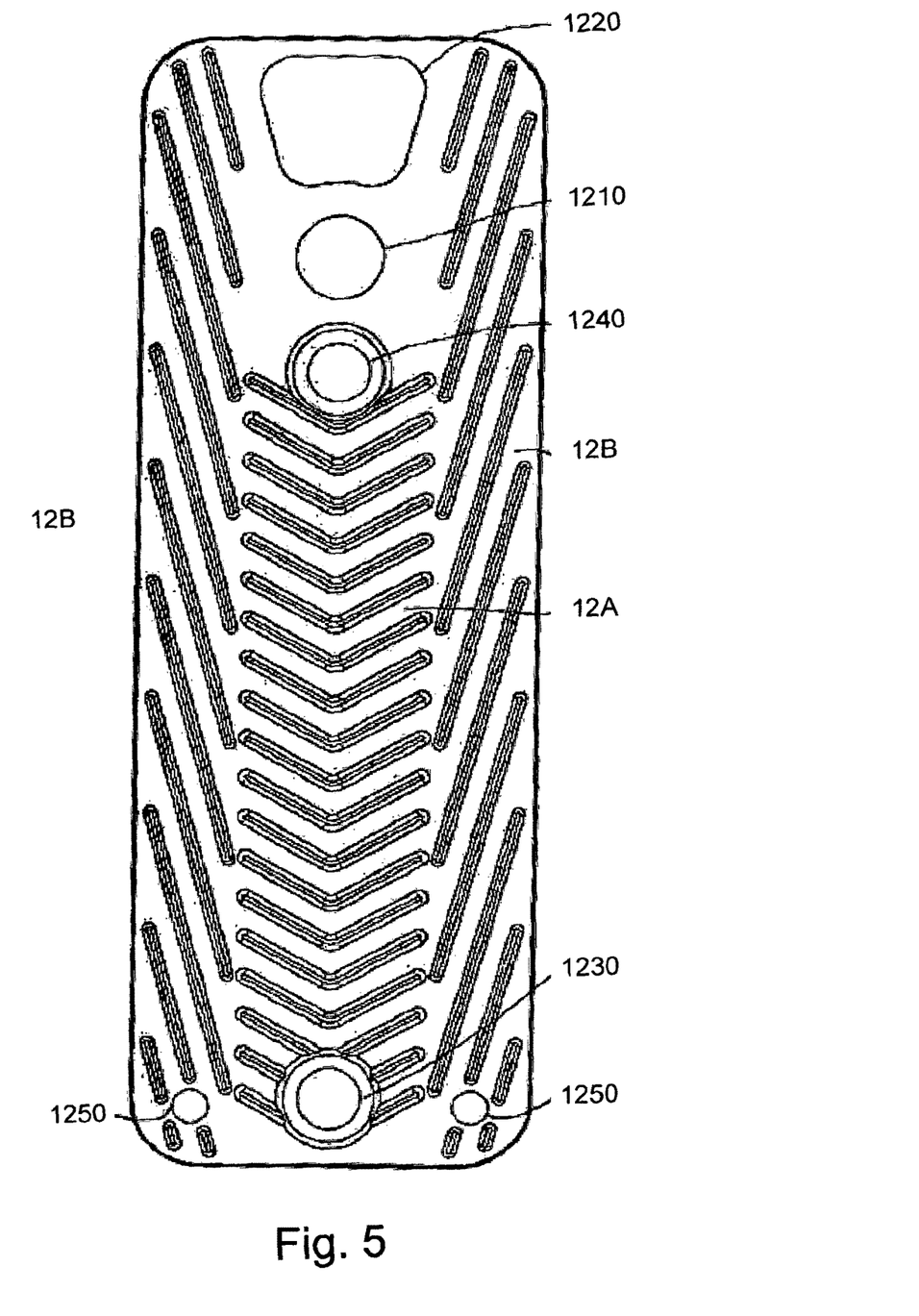
FIG. 5 is a plan view of a pressed plate used in an evaporator according to one embodiment of the invention.

In FIG. 5, another embodiment of the present invention is shown. For the embodiment shown in FIG. 4, the features have been denoted by four-digit numbers starting with 12 instead of 11; for example, the brine inlet port 1130 of the embodiment of FIG. 1 is denoted 1230 in the embodiment of FIG. 5. The functions of the features are otherwise as shown in the embodiment of FIG. 4.

The major difference between the embodiment of FIG. 4 and the embodiment of FIG. 5 is that there will be even less overheating of evaporated coolant in the embodiment of FIG. 5, since the evaporated coolant will have a shorter intermediate distance to travel from the time it has been evaporated in the are 12A until it enters the area 12B where no heat exchange will occur.

Figure 6:
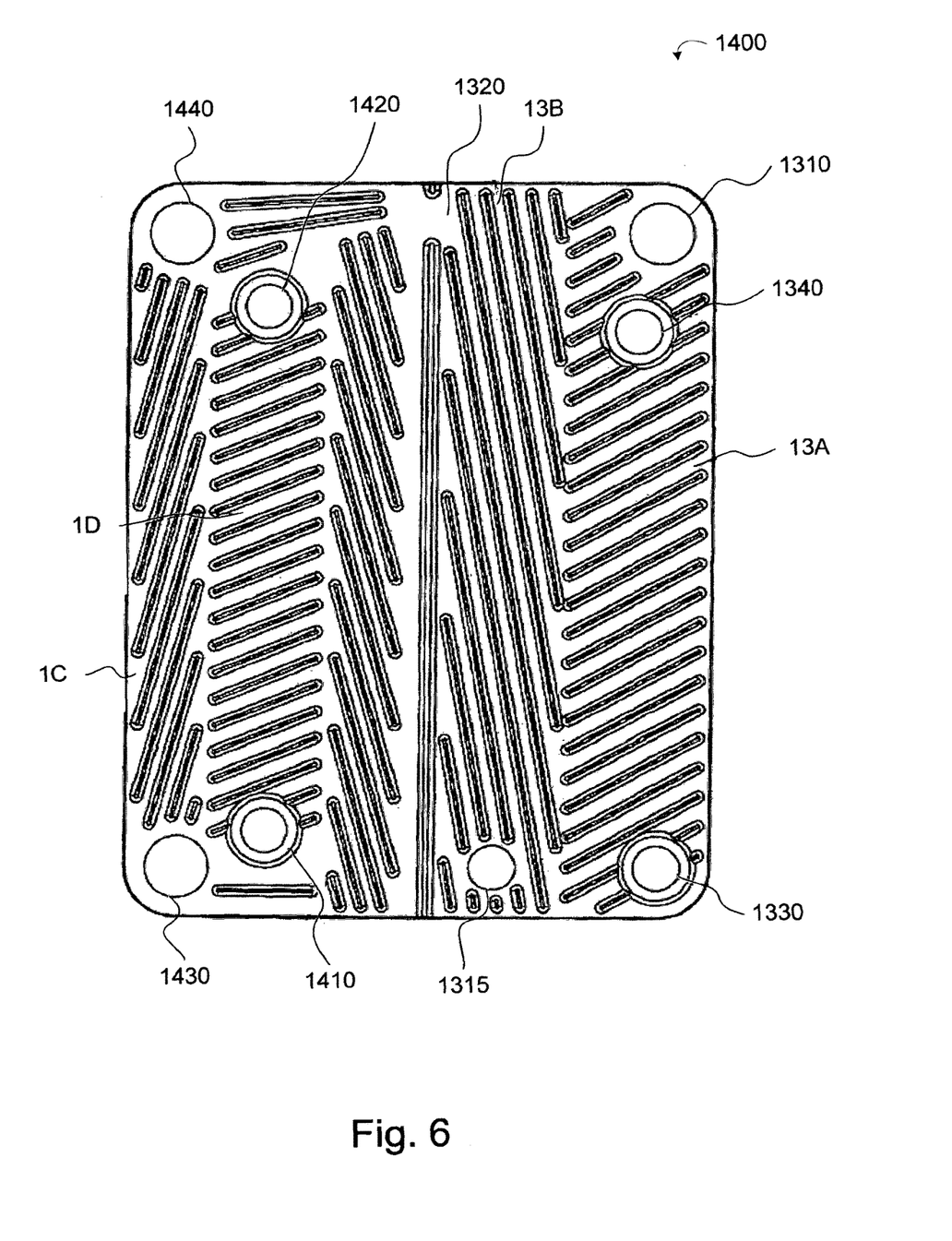
FIG. 6 is still another plate usable for embodying an evaporator according to the present invention.

A plate 1400 of another embodiment of the invention, namely a combined evaporator and condenser is shown in FIG. 6. Just like in the previous embodiments, the plate 1400 of FIG. 6 is placed in a stack such that neighboring plates form spaces for the flow of fluids to exchange heat, in a way well known by persons skilled in the art. The combined unit according to this embodiment comprises an inlet 1310 for a mixture of carrier and volatile component, an outlet 1315 for carrier, a brine inlet 1330, a brine outlet 1340, the brine heating an area 13A such that volatile component mixed with carrier entering the inlet 1310 evaporates while falling down the area 13A. An opening 1320 connects an area 13B having the same function as the areas AB and 12B of the previously disclosed embodiments with a condenser 1400.

The condenser 1400 comprises two distinct areas, namely area AC and area AD, wherein area AC resembles the area 13B in that no heat exchange takes place there, and wherein area AD resembles area 13A in that there is a heat exchange between gaseous matter having entered the condenser via the opening 1320 and a cooling liquid entering a space delimited by two neighboring plates via a cooling inlet 1410, leaving the space via an outlet 1420 and not having contact with the spaces containing the gaseous media. Heat exchange between the gas and the cooling liquid will condense the gas, into droplets, and the droplets will agglomerate to a liquid flow falling down the area AD until it reaches a condensate outlet 1430, from which it may be extracted.

Moreover, a solution inlet 1440 is arranged for communication with the outlet 430. In use, carrier having a very low content of, and hence high affinity to, volatile component is fed through the solution inlet such that it will form a falling film on the area AD. There, it will absorb gaseous volatile component under formation of heat, which will be transferred to fluid travelling between the cooling inlet 1410 and the outlet 1420. The fluid travelling this space may be e.g. heating fluid in a domestic heating system.

In one embodiment, the area AD (and consequently also the inlets and outlets 1410, 1420) can be omitted. In this case, condensation (or absorption) occurs due to contact between cold liquid running in a loop from the outlet 1430 to an external heat exchanger (not shown) where it is cooled down, to the inlet 1440. By using this embodiment, it is possible to use both sides of all plates as areas where gas having entered the condenser will condense or be absorbed into the liquid circulating in the closed loop.

Figure 7:
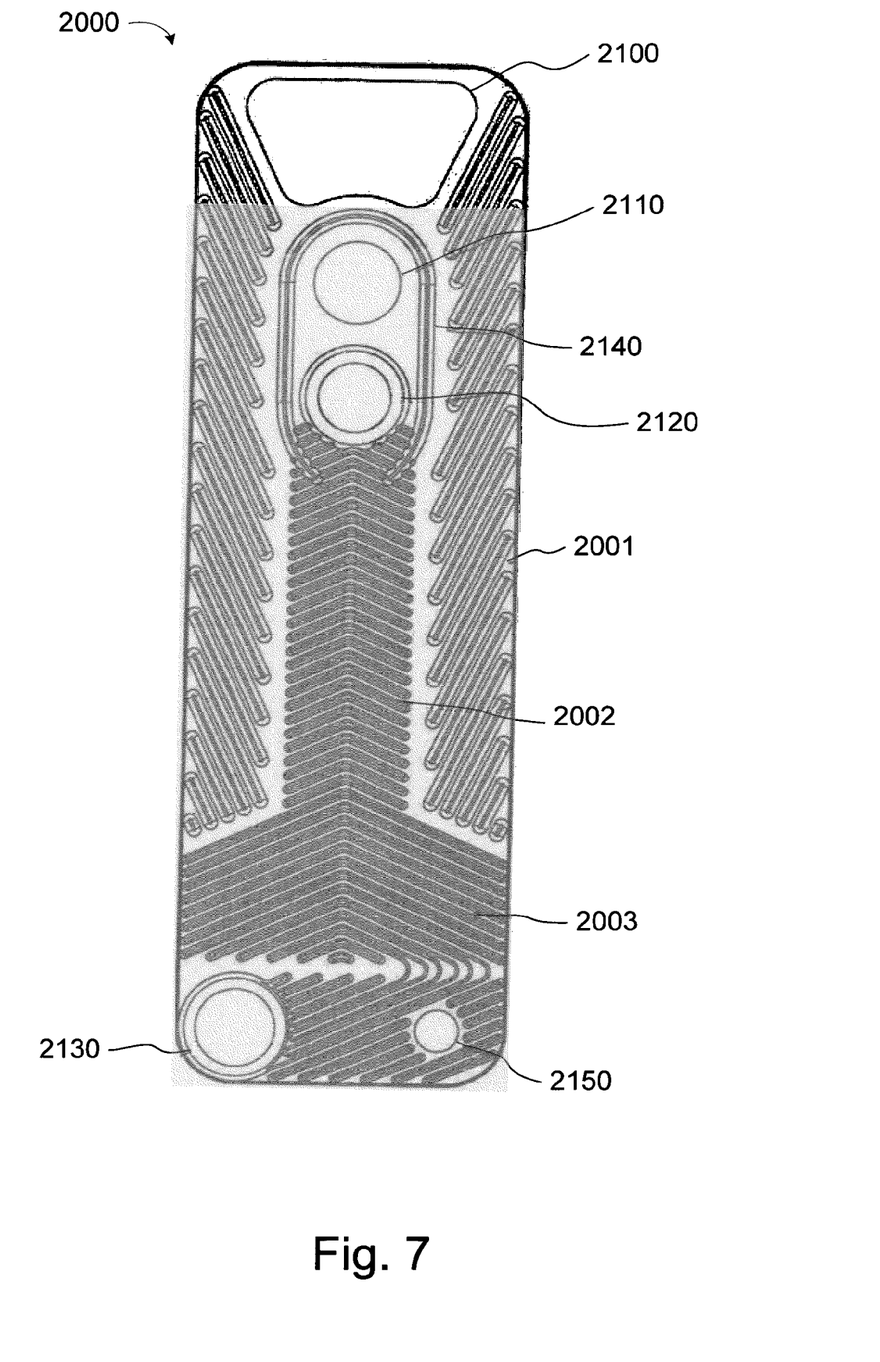
FIG. 7 is another variety of a plate used in an evaporator according to the present invention.

Still another embodiment of the present invention is disclosed with reference to a plate 2000 shown in FIG. 7. The plate 2000 comprises a gas outlet 2100, a solution inlet 2110, a first brine connection 2120, a second brine connection 2130 and a carrier outlet 2150. A shroud 2160 covers the solution inlet 2110. Moreover, the plate is provided with a pressed pattern of ridges and grooves adapted to keep neighboring plates on a distance from one another such that interplate flow channels are formed between the plates. By providing areas on high or low levels, it is possible to provide selective communication between the different openings. This is done in the same way as has been disclosed above with reference to FIGS. 2 and 3, and will hence not be disclosed in more detail.

The plate 2000 comprises three different areas, namely a gas area 2001, a falling film area 2002 and a flooded area 2003.

The outlets and inlets are arranged such that the gas outlet 2100, the solution 2110 inlet and the carrier outlet 2150 are in fluid communication with one another, while the first 2120 and second 2130 brine connections are in fluid communication with one another. The fluid communication between the brine connections will take place via the falling film area 2001 and the flooded area 2003, while the communication between the solution inlet, the carrier outlet and the gas outlet will take place over the entire plate area. As could be understood by persons skilled in the art, the communication between the brine connections occurs between first plate interspaces, and the communication between the gas outlet 2100, the solution 2110 inlet and the carrier outlet 2150 occurs between second plate interspaces.

In use, solution comprising carrier and volatile component are let in through the solution inlet 2110. The shroud 2140 makes sure that this solution will flow downwards, to the falling film area 2002. At the falling film area, the solution will form a thin film falling down towards the flooded area 2003, while exchanging heat with brine flowing between the brine connections 2120 and 2130, on the opposite side of the plates between which the solution flows.

As the falling film has fallen all down to the flooded area 2003, a significant part of the volatile component has evaporated, and hence left the evaporator via the gas areas 2001. The remaining carrier, including some volatile component, enters the flooded area, which preferably is filled with carrier having some content of volatile component. However, as mentioned above, the brine also flows in the flooded area, meaning that there will be a heat exchange between the carrier and the brine also in this area. Hence, some of the remaining volatile component will boil off in the flooded area as well.

Finally, carrier having a low content of volatile component may be extracted from the carrier outlet 2150.

In case insufficient amounts of volatile component has evaporated from the solution in the falling film area, it might be necessary to pump carrier from the carrier outlet up to the solution inlet for another round over the falling film area and the flooded area. In such a case, it might be preferred to provide a second outlet, located above the carrier outlet 250, and draw carrier to be let into the solution inlet for another round over the falling film area trough this second outlet, such that the retention time, and hence time for boiling off volatile component, in the flooded area is will increase.

As briefly mentioned above, the plates 400 and plate 200 are brazed together with neighboring plates to form an evaporator and/or a combined evaporator and absorber. The brazing process comprises to provide the plates (which may be made from stainless steel or aluminum) with a coating of a brazing material. It is also possible to provide the brazing material In form of a thin plate that is cut and pressed along with the plate 200,400. The brazing material has a lower melting temperature than the material from which the plates are made. Known examples of brazing material for stainless steel are copper and stainless steel blended with a melting point depressant, e.g. Boron (B) and/or Phosphorous (P) and/or Silicone (Si).

However, in the case of an absorption process, both the carrier and the volatile component are often aggressive; hence, it might be necessary to use chemically more inert brazing materials, e.g. Chrome (Cr) and/or Nickel (Ni).

Another option is to use separate brazing materials for the sides of the plates 200 and 400 coming into contact with the coolants and the brine. As mentioned above, the plates 200 and 400 and their respective neighboring plates are not entirely identical. Hence, it is not possible to use the same tool for pressing the plates 200, 400 and their neighboring plates. It is therefore possible to press the plates 200, 400 together with a thin plate of a first brazing material and the neighboring plates together with a second brazing material. By doing this, it is possible to achieve an evaporator and/or an absorber or a combined absorber having a first brazing material brazing the brine channels (i.e. the channels between the inlets and outlets 450, 460; 650, 660 and 250, 260, respectively) and a second brazing material brazing all other flow channels, i.e. the flow channels coming into contact with the coolant. The first brazing material may be copper, and the second brazing material may be a brazing material having a good resistance against the coolant, e.g. nickel or chrome or a combination thereof.

Figure 8:
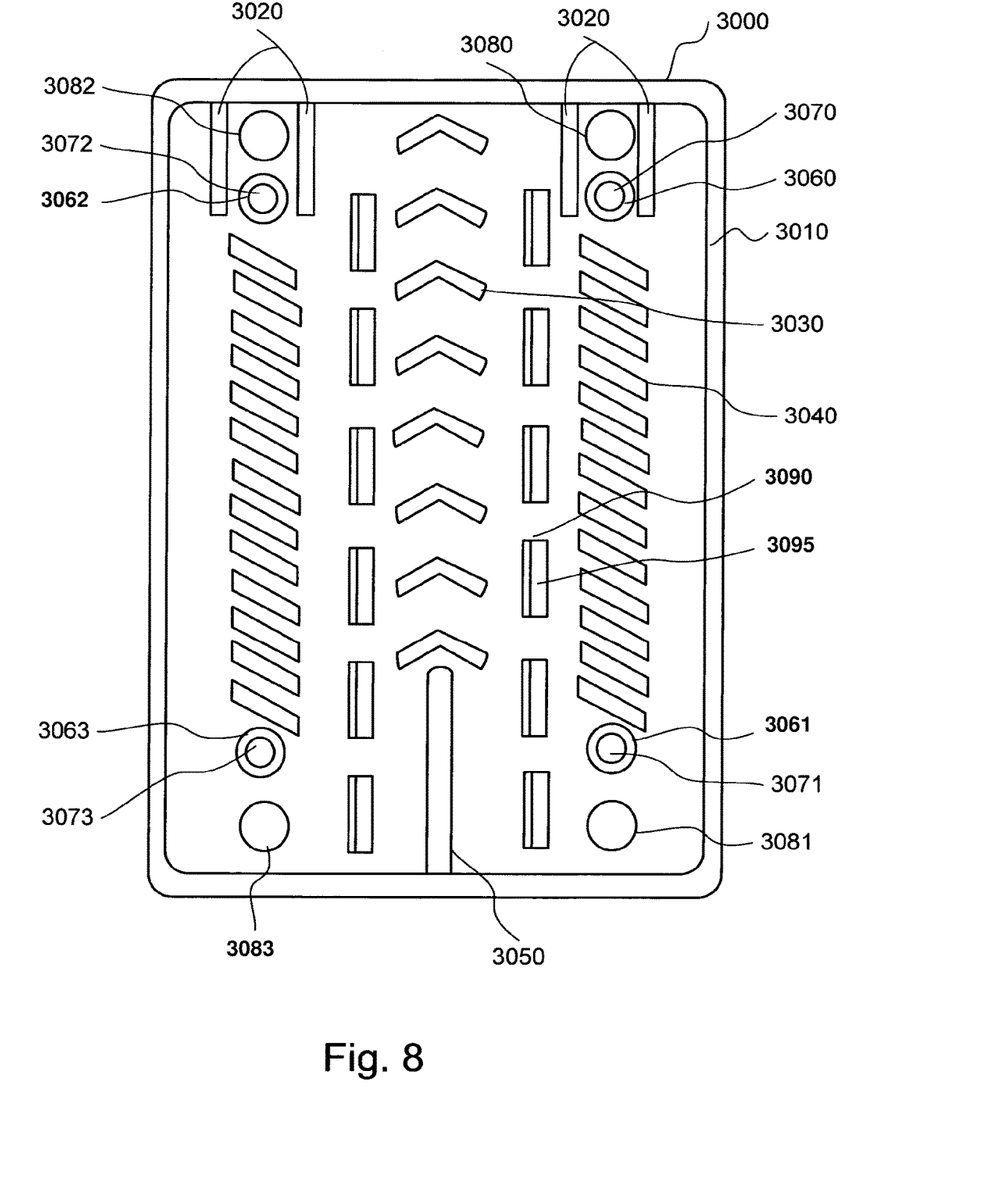
FIG. 8 is a schematic plan view of a pressed plate according to still another embodiment of the present invention.

Another embodiment of the invention is shown in FIG. 8. In this embodiment, a number of identical heat exchanger plates 3000 are stacked onto none another. Each of the heat exchanger plates is provided with a pressed pattern comprising elevated portions and depressed portions.

More specifically, the plate 3000 has a basic, low height, covering all areas except for the ones defined below, which are provided at a high level:

1. An edge portion 3010 that runs along the entire circumference of the heat exchanger plate;
2. A shroud 3020;
3. Herringbone ridges 3030;
4. Heat exchanging areas 3040;
5. a division wall 3050; and
6. elevated areas 3060, 3061, 3062, 3063 around port openings 3070, 3071, 3072, 3073.

Moreover, the plate 3000 is provided with port openings 3080, 3081, 3082, 3083, which are situated on a low level.

When stacked to form a stack of heat exchanger plates, every other heat exchanger plate is turned upside down with relation to its neighboring plate. By this, the following is achieved:

In the first interplate space, there will be a connection between the edge portions 3010 of neighbouring plates, the shrouds 3020, the herringbone ridges 3030, crossing points between the heat exchanging areas 3040, the division walls 3050 and the elevated areas 3060, 3061, 3062, 3063 around the port openings 3070, 3071, 3072, 3073. All other areas will form a interplate space open for fluid flow. In the neighbouring, second, interplate spaces, there will be a flow channel between the port openings 3070, 3071 and 3072, 3073, respectively. There will also be spaces between the herringbone ridges 3030, but such spaces will not have any function with regards to the fluid flow.

In use, the heat exchanger formed by the stack of heat exchanger plates 3000 will be placed with the herringbone pattern pointing upwards, i.e. such as shown in FIG. 8. Fluid to be evaporated will be sprayed or injected into the port opening 3080, which is fluidly connected to the first interplate space. From the port opening 3080, it will fall downwards past the port opening 3070, restricted from flowing too far sideways by the shrouds 3070. The fluid will then come in contact with the heat exchanging areas 3040 and form a "falling film" thereon, i.e. a film that slowly meanders downwards on the heat exchanging areas 3040. The falling film then continues downwards past the port opening 3071 to the port opening 3081, from which it may be evacuated from the heat exchanger. The dividing wall 350 will restrict the fluid from entering the opposite side of the dividing wall 3050.

The falling film created by the fluid to be evaporated will exchange heat with a second fluid that circulates between the port openings 3070, 3071, and vaporized fluid to be evaporated will escape the heat exchanging areas 3040 and pass the herringbone pattern 3030 on its way to be condensed. The herringbone pattern has a double function: Firstly, it provides for a support between neighbouring plates and secondly, it will stop fluid to be evaporated in liquid form to pass. By the herringbone pattern, liquid fluid to be evaporated that may be on its way to follow the evaporated fluid to be evaporated will have to overcome the force of gravity in order to pass the herringbone pattern. Liquid fluid that does not overcome the force of gravity will fall back to the liquid fluid that has been restricted to enter the opposite side of the dividing wall.

On the opposite side of the herringbone ridges 3030, there is a second falling film heat exchanger having the same design as the previously described falling film arrangement, which serves to condense or absorb the evaporated fluid from the previously described falling film arrangement.

The embodiment according to FIG. 8 may also include one or several rows of heat transfer braking takeouts 3090.

Such heat transfer braking takeouts may be in form of openings, preferably elongate, or punched semi-openings, wherein the material of the opening is "saved" in the form of a "tongue" 3095 that extends obliquely from the base level. In the embodiment of FIG. 8, it is advantageous if all tongues are directed in the same direction.

One benefit, except from decreasing heat transfer between the falling film arrangements of the embodiment of FIG. 8, is that the openings or semi-openings make it possible for evaporated fluid to travel between the plate interspaces. This might be advantageous if there is a "mismatch" between the evaporating capability and the absorbing capability of the falling film arrangements of one plate interspace.

As could be understood, the plates 3000 of the embodiment according to FIG. 8 may be joined by any of the brazing methods as disclosed above.

It should be noted that the above descriptions are examples of preferred embodiments of the present invention; the scope of protection should only be determined by the appended claims.

For example, the evaporator according to above may not only be used for absorption processes, but also as an evaporator or condenser for an "ordinary" cooling and/or heating process with a single component coolant. As well known by persons skilled in the art, prior art evaporators work with an "inline" evaporation, usually arranged in a counter flow fashion. This means that liquid coolant to be vaporized is admitted into the interplate space where the brine with which it is supposed to exchange heat has the lowest temperature. After having traveled within this interplate space for a while, the coolant starts boiling. In this context, it is worth to notice that the first coolant to vaporize is the coolant closest to the plate. Having vaporized coolant closest to the plate transferring the heat to the coolant is very inefficient; it is well known by persons skilled in the art that the heat transfer rate is much lower if a vaporized layer of coolant separates the liquid coolant from the plate surface. In order to make sure that no liquid coolant leaves the prior art evaporator, the coolant must be overheated.

With an evaporator according to the invention, this problem can be avoided, or at least mitigated; there is only a short way for evaporated coolant to travel before it enters an area where it no more is supposed to take part in any heat transfer, and the film formed from the constant falling of coolant from the coolant inlet on the surfaces of the areas will be rapidly reformed after a bubble of gaseous coolant has formed on the surface of the heat exchanging area. The gas will rapidly leave the area A and enter the area leading to the gas outlet 280.

Compared to a prior art plate evaporator, there will be very little overheating of the evaporated coolant. This is very beneficial for the system efficiency of the heating or cooling system.

One possible use of the combined evaporator and absorber according to FIG. 3, 6 or 8 is desalination of salt water; in that case, salt water is let in through the inlet 440, 1310 or 3080, where it is allowed to fall in form of a film under heat exchange with a heating fluid passing from the inlet 460 to the outlet 450 or 1340, 1330. Water evaporating from the saline water solution will travel to the heat exchanging area connected to the inlets and outlets 660, 650 or 1410, 1420, where the water will be condensed into droplets that will pour down to the outlets 670 or 1430, where the water will be desalinated.

If the distance between the inlets and outlets 450 and 460 or 1330 and 1340 is long enough, it may be possible to vaporize sufficient amounts of the water in the salt water let in through the inlet 440 or 1310, and only extract really salt water from the outlet 470 or 1315. In most cases, however, this will not be the case, meaning that it will probably be necessary to recirculate some of the enriched water from the outlet 470 or 315 to the inlet 440 or 1310 for another "round" with heat exchange with the heating liquid and associated evaporation, hence enriching the solution even further.

The invention claimed is:

1. An evaporator for an absorption heat pump or a single coolant cooling process, the evaporator comprising a number of stacked plates provided with a pressed pattern to hold the plates on a distance from one another to form a heat exchanging strip, vapor leading spaces and outer walls, the heat exchanging strip being designed such that heat carrier flow channels are formed by internal surfaces of the heat exchange strip, said heat carrier flow channels connecting a heat carrier inlet and a heat carrier outlet, wherein a coolant forms a falling film on external surfaces of the heat carrier flow channels by being provided above the heat carrier flow channels by a coolant inlet, wherein coolant being vaporized from the external surfaces of the heat carrier flow channels by heat from a heat carrier flowing from the heat carrier inlet to the heat carrier outlet rapidly enters the vapor leading spaces, wherein the vapor leading spaces are provided between the heat exchanging strip and the outer walls, and wherein the evaporator includes a coolant outlet at a lower portion of the evaporator for letting out coolant that has fallen from the coolant inlet over the external surface of the heat carrier flow channels of the heat exchanging strip without being vaporized, wherein a lower part of the heat exchanging strip located in the vicinity of the coolant outlet extends all the way out to the outer walls.

2. The evaporator of claim 1, wherein the vapor leading spaces are provided with openings.

3. The evaporator of claim 1, further comprising a gas outlet situated above the coolant inlet.

4. The evaporator of claim 3, further comprising an absorber being connected to the gas outlet.

5. The evaporator of claim 4, wherein the absorber is identical to the evaporator.

6. The evaporator of claim 4, wherein the evaporator and the absorber are manufactured from the same piece of sheet metal.

7. The evaporator of claim 6, wherein the evaporator and the absorber are divided by a semi tight wall.

8. The evaporator of claim 7, wherein the semi tight wall comprises a herringbone pattern designed to stop liquid fluid from passing the wall.

9. The evaporator of claim 6, further comprising heat transfer braking takeouts arranged to reduce heat transfer between the evaporator and the absorber.

10. The evaporator of claim 9, wherein the heat transfer braking takeouts comprise semi-openings wherein material from the opening is provided in a form of a tongue.

11. An evaporator for an absorption heat pump or a single coolant cooling process, the evaporator comprising a number of stacked plates provided with a pressed pattern to hold the plates on a distance from one another to form a heat exchanging strip, vapor leading spaces, and outer walls, the heat exchanging strip being designed such that heat carrier flow channels are formed by internal surfaces of the heat exchanging strip, said heat carrier flow channels connecting a heat carrier inlet and a heat carrier outlet, wherein a coolant forms a falling film on external surfaces of the heat carrier flow channels by being provided above the heat carrier flow channels by a coolant inlet, wherein coolant being vaporized from the external surfaces of the heat carrier flow channels by heat from a heat carrier flowing from the heat carrier inlet to the heat carrier outlet rapidly enters the vapor leading spaces, wherein the vapor leading spaces are provided between the heat exchanging strip and the outer walls, and further comprising a gas outlet situated above the coolant inlet, an absorber being connected to the gas outlet, and the absorber is identical to the evaporator.

12. The evaporator of claim 11, further provided with a coolant outlet at a lower portion of the evaporator for letting out coolant that has fallen from the coolant inlet over the external surfaces of the heat carrier flow channels of the heat exchanging strip without being vaporized.

13. The evaporator of claim 11, wherein a lower part of the heat exchanging strip located in the vicinity of the coolant outlet extends all the way out to the outer walls.

14. The evaporator of claim 11, wherein the vapor leading spaces are provided with openings.

15. The evaporator of claim 11, wherein the evaporator and the absorber are manufactured from the same piece of sheet metal.

16. The evaporator of claim 15, wherein the evaporator and the absorber are divided by a semi tight wall.

17. The evaporator of claim 16, wherein the semi tight wall comprises a herringbone pattern designed to stop liquid fluid from passing the wall.

18. The evaporator of claim 16, further comprising heat transfer braking takeouts arranged to reduce heat transfer between the evaporator and the absorber.

19. The evaporator of claim 18, wherein the heat transfer braking takeouts comprise semi-openings wherein material from the opening is provided in a form of a tongue.

20. An evaporator for an absorption heat pump or a single coolant cooling process, the evaporator comprising a number of stacked plates provided with a pressed pattern to hold the plates on a distance from one another to form a heat exchanging strip, vapor leading spaces, and outer walls, the heat exchanging strip being designed such that heat carrier flow channels are formed by internal surfaces of the heat exchanging strip, said heat carrier flow channels connecting a heat carrier inlet and a heat carrier outlet, wherein a coolant forms a falling film on external surfaces of the heat carrier flow channels by being provided above the heat carrier flow channels by a coolant inlet, wherein coolant being vaporized from the external surfaces of the heat carrier flow channels by heat from a heat carrier flowing from the heat carrier inlet to the heat carrier outlet rapidly enters the vapor leading spaces, wherein the vapor leading spaces are provided between the heat exchanging strip and the outer walls, further comprising a gas outlet situated above the coolant inlet, an absorber portion being connected to the gas outlet, the evaporator and the absorber are manufactured in the same piece of sheet metal, the evaporator and the absorber are divided by a semi tight wall, and the semi tight wall comprises a herringbone pattern designed to spot liquid fluid from passing the wall.

21. The evaporator of claim 20, further provided with a coolant outlet at a lower portion of the evaporator for letting out coolant that has fallen from the coolant inlet over the external surfaces of the heat carrier flow channels of the heat exchanging strip without being vaporized.

22. The evaporator of claim 20, wherein a lower part of the heat exchanging strip located in the vicinity of the coolant outlet extends all the way out to the outer walls.

23. The evaporator of claim 20, wherein the vapor leading spaces are provided with openings.

24. The evaporator of claim 20, further comprising heat transfer braking takeouts arranged to reduce heat transfer between the evaporator and the absorber.

25. The evaporator of claim 24, wherein the heat transfer braking takeouts comprise semi-openings wherein material from the opening is provided in a form of a tongue.

* * * * *